PATENTED JAN 18 1972
3,635,213
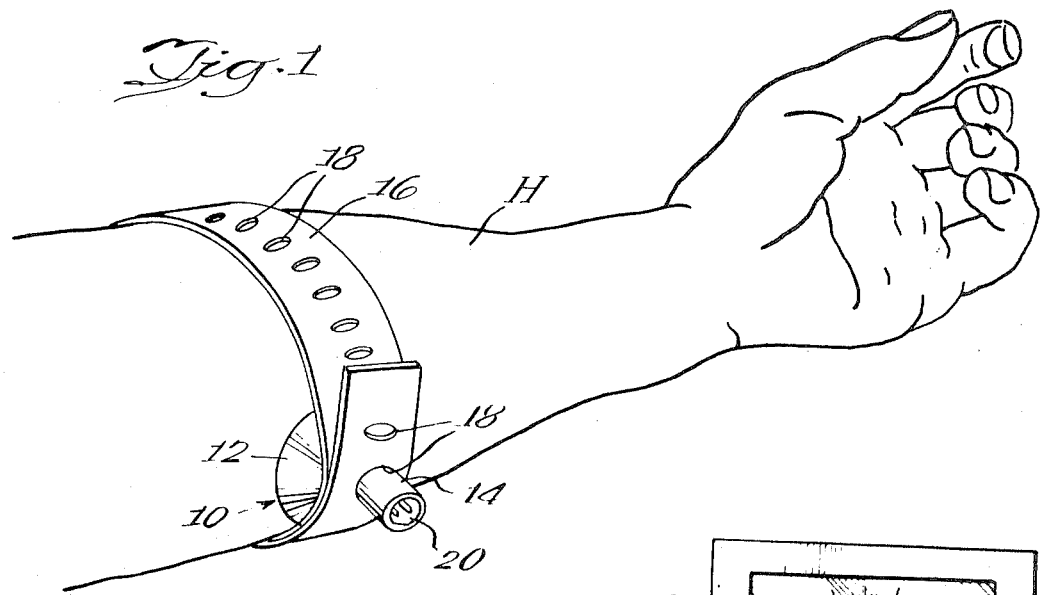
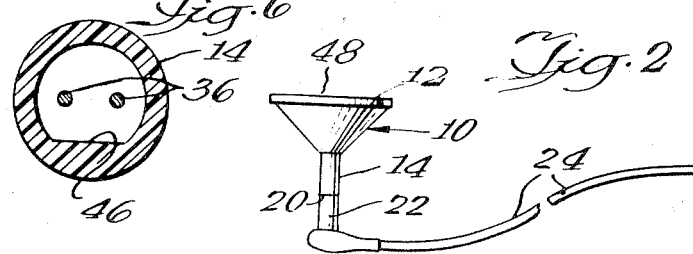
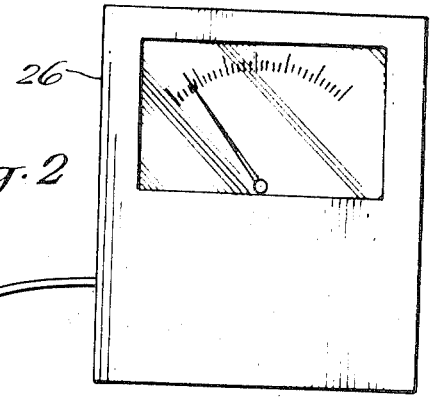
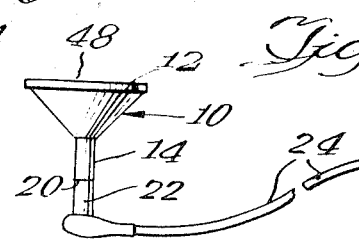
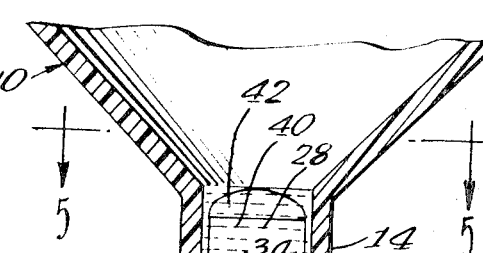
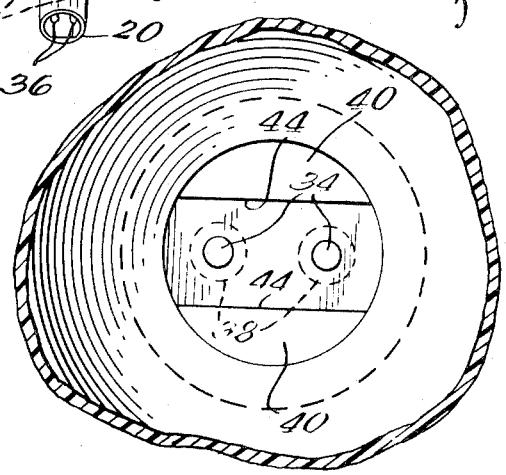
INVENTOR
James F. LaHay
BY Jerome M. Teplitz
ATTORNEY

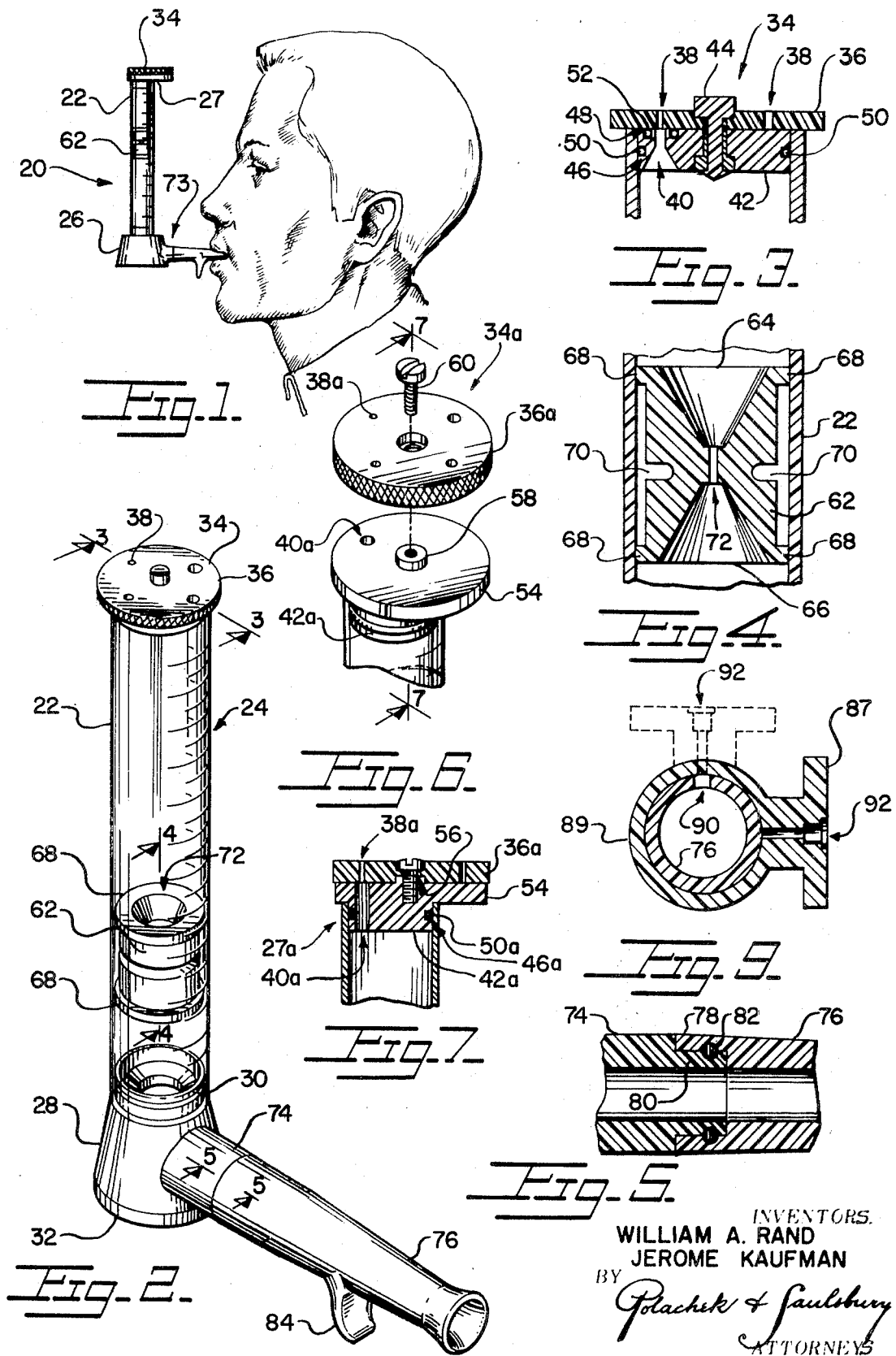

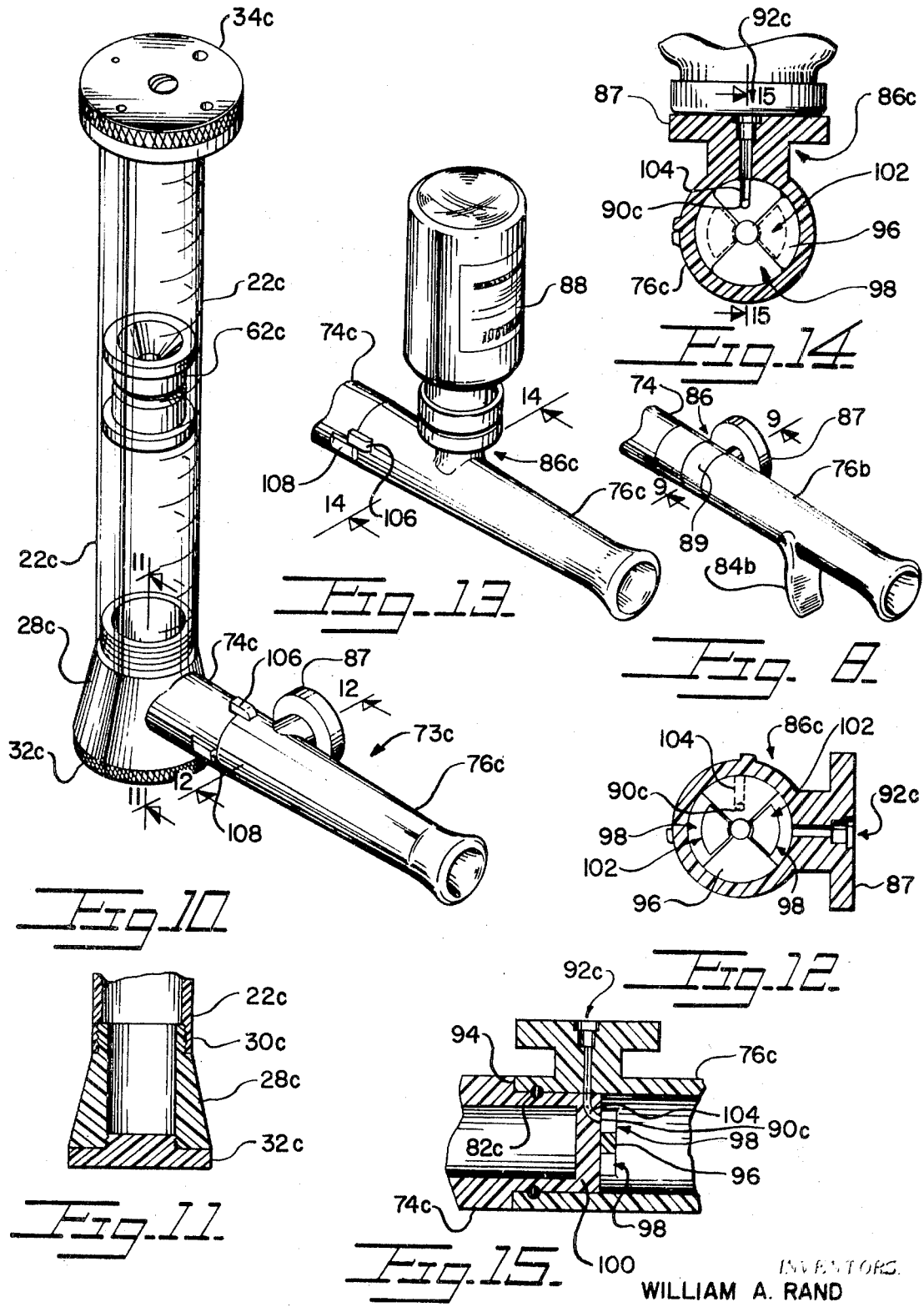

VISUAL PULMONARY METER

This invention relates to a respiration device and in particular to a visual meter for screening pulmonary performance.

The visual pulmonary meter of this invention provides a rapid and efficient means for measuring or monitoring a patient's expiratory reactions such as the expiratory flow rate and pulmonary capacity. The device is also convertible for use as a medicinal inhalator.

This invention is especially useful in the medical management of patients subjected to respiratory ailments and will permit the patient to monitor the progress of his treatment while away from the physician's office. The meter has therefore been designed to be simple to operate and is conveniently pocket-sized for portability.

Conventional apparatus of this type, also known as spirometers, and applicable for measuring or testing respiratory capacity or for pulmonary function analysis, usually include a float, follower, stylus or other moveable element for recording relative displacement in response to an expiratory force. The moveable element may be activated by a bellows member orientated for expansion in response to the exhalation of the patient. Other apparatus use a slide mounted stylus mechanically linked by gears to a propeller shaft whereby the exhalation of the patient rotates the propeller and shaft; the rotating shaft in turn moves the stylus. Further devices include a spirometer wherein the air expelled from the lungs acts upon a body of water or other fluid contained in a vessel or bottle and forces the liquid upward in a tube depending in the vessel. The tube contains a float which is carried upwardly by the column of water in the tube and is used as a determination of the relative displacement. None of the aforementioned apparatus, however, have the degree of portability or simplicity of operation as the visual pulmonary meter of this invention and, in fact, many of those devices require a technician to interpret, record and operate.

This instant invention is comprised of a hollow cylindrical chamber made from a transparent material and preferably provided with a scale or other indicating device along its longitudinal surface. A breathing tube assembly is connected to one end of the cylindrical chamber to provide a flow passageway and terminates in a mouthpiece through which a patient may exhale into the cylindrical chamber. A piston is slidably received within the cylindrical chamber and will be forced upwardly therein by the expiratory force of the exhalation. The piston is further provided with an air passage so that some of the air can pass through the piston and reach the other end of the cylindrical chamber. An air exit regulator is provided at the other end of the cylindrical chamber for controlling air egress and has a plurality of calibrated apertures which may be selectively placed in registration with an opening in the other end of the chamber. The rate at which the air is permitted to escape from the chamber will thus determine the resistance to piston movement and will thereby control the velocity and distance the piston will travel inside cylindrical chamber. The breathing tube assembly may also include a rotatably journaled adapter having a holder for introducing an inhalator. In an alternate embodiment, the device is provided with a slidable gate valve and adapter for securing a medicament container. The valve may be selectively operated to either permit exhalation into the cylindrical chamber or inhalation of the medicinal vapor.

The relative movement of the piston as measured along the scale will be an indication of the respiratory flow rate and volume, or forced expiratory flow, and lung capacity. Furthermore, and since the visual pulmonary meter reacts to volume of air exhaled into the cylindrical chamber as a measure of or in relation to time to thereby measure the flow rate, this invention can be advantageous in detecting obstructive lung disease which may have no effect on the lung capacity but will however effect the rate at which air is exhaled. Additionally, with the use of this meter a patient may follow the pattern of progress during drug therapy and can quickly alert the physician when necessary. Another feature is the application for the purposes of exercising a patient's respiratory muscles. As a further use, either separately or in conjunction with the meter, is as an inhalator.

It is an object of the present invention to provide a visual pulmonary meter of the general character described.

A further object of this invention is to provide a pulmonary meter which will measure and determine the expiratory flow rate and the pulmonary capacity.

A still further object of the present invention is to provide a visual pulmonary meter having means for the operational attachment of a medicinal inhalator.

Another object of the present invention is to provide a visual pulmonary meter having a cylindrical chamber and slidably received piston activated by air exhaled through a breathing tube assembly communicating with one end of the chamber.

Still another object of the present invention is to provide a visual pulmonary meter wherein the resistance to the movement of the piston may be selectively varied by means of an air exit regulator.

The above and other objects, features and advantages of the invention not specifically pointed out will be apparent from the following description of the invention.

In the accompanying drawings in which are shown preferred embodiments of the invention and possible combinations thereof:

FIG. 1 is a pictorial representation of a patient exhaling into the visual pulmonary meter of this invention;

FIG. 2 is a perspective view of the visual pulmonary meter illustrating a cylindrical chamber containing a slidable piston therein with a breathing tube assembly shown attached to the base of the cylindrical chamber;

FIG. 3 is a sectional view to an enlarged scale of an air exit regulator taken along line 3—3 of FIG. 2 which shows a rotatably mounted cap member having calibrated apertures therein for selective registration with an exit port from the cylindrical chamber;

FIG. 4 is a partial sectional view to an enlarged scale, of the piston taken along line 4—4 of FIG. 2, and illustrates the air passageway centrally through the piston for permitting air to reach the exit port and escape through the exit regulator;

FIG. 5 is a sectional view to an enlarged scale taken along line 5—5 of FIG. 2 and shows the details of the snap fit engagement of a mouthpiece to a tubular projection extending from the cylindrical chamber, an O-ring is interposed between the connecting members for an airtight fit;

FIG. 6 is an exploded perspective view of an alternate embodiment of an air exit regulator wherein an apertured cap is provided with an annular recess and is rotatably mounted over an annular protrusion in a plug member located in the upper end of the cylindrical chamber;

FIG. 7 is a sectional view taken along line 7—7 of FIG. 6 and shows one of the apertures in the cap member in registration with an exit port in the plug member;

FIG. 8 is a perspective view of a modified embodiment of the breathing tube assembly shown with an adapter for accommodating an inhalator;

FIG. 9 is a sectional view to an enlarged scale of the adapter taken along line 9—9 of FIG. 8 and shows the adapter rotatably mounted around a mouthpiece and having a holder for accepting a medicament container, the holder has an intake duct and may be rotated (as shown by the phantom lines) so that the duct is in registration with a port in the mouthpiece;

FIG. 10 is a perspective view of a modified embodiment of this invention wherein the breathing tube assembly includes a hollow tubular projection extending from the base of the cylindrical chamber and the adapter is formed as an integral part of the mouthpiece which is journaled to the projection;

FIG. 11 is a partial sectional view taken along line 11—11 of FIG. 10 and shows the base of the cylindrical chamber including a pedestal member threadingly engaged in the bottom of the cylindrical chamber and further having a plug member engaged within the bottom of the pedestal member;

FIG. 12 is a sectional view to an enlarged scale taken along line 12—12 of FIG. 10 and shows a slidable gate valve shown in an open position with the inhalator holder in a noninhalation position;

FIG. 13 is a partial perspective view showing the mouthpiece in a position rotated 90° from that in FIG. 10 wherein the adapter and medicine container attached thereto are in position for inhalation;

FIG. 14 is a partial sectional view to an enlarged scale taken along line 14—14 of FIG. 13 and shows the gate valve in a closed position with the inhalator operational and passage to the cylindrical chamber being sealed; and FIG. 15 is a partial sectional view of the gate valve taken along line 15—15 of FIG. 14 showing the communication between the passageway in the holder and the supplemental passageway in the tubular projection extending from the base, said supplemental passageway opening into the cylindrical chamber in the position shown, and is blocked by the gate valve when the holder has been rotated to a noninhalation position.

Referring now in detail to the drawings, the reference numeral 20 denotes the visual pulmonary meter constructed in accordance with and embodying the invention. The meter 20 is comprised of a hollow cylindrical chamber 22 constructed of a transparent material such as glass or plastic e.g., "Lexan," and may be provided with a graduated scale or other calibrated markings 24, along the longitudinal surface. The lower end or base 26 of the cylindrical chamber 22 includes a pedestal member 28 having a threaded portion 30 at one end for engagement with the cylindrical chamber 22. The other end of the pedestal member 28 is closed by a plug member 32. An upper end 27 of the cylindrical chamber 22 is provided with an egress regulating means in the form of an air exit regulator 34. The regulator 34 includes a cap member 36 which is provided with a plurality of calibrated apertures 38 of varying sizes. The apertures 38 are placed within cap member 36 so as to be in selective registry with an exit port 40 formed in a plug member 42 secured within the upper end 27 of the cylindrical chamber 22. A pin fastener 44 preferably plastic, rubber, or other resilient material and having a snap fit is used to secure the cap member 36 to the plug member 42 and will permit for the rotation of the cap member 36 about the pin 44 so that one of said apertures 38 may be selectively placed in registration with exit port 40. Grooves 46 and 48 are provided in the plug member 42 to accommodate sealing means such as O-rings 50 and 52 for insuring a snug, airtight fit.

A modified embodiment, an air exit regulator 34a, is shown in FIGS. 6 and 7 wherein like numerals are used to represent like parts in the various embodiments throughout the specification and the suffix letter a has been used to designate like parts in this modification. In this embodiment, an annular recess 56 is provided in a cap member 36a. A plug member 42a secured within the upper end 27a is provided with a radial outward extension 54 for supporting the annular cap member 36a and further includes an annular protrusion 58 which is accommodated within the annular recess 56 and provides a pivot about which the cap member 36 may be rotated. A screw or bolt 60 is provided for fastening the cap member 36a to the plug member 42a in the desired rotational position. The plug member 42a is also provided with a plurality of apertures 38a of varying sizes (in the embodiment shown four apertures are used) which may be selectively placed in registry with an exit port 40a formed in the plug member 42a. Furthermore, grooves 46a are provided in the plug member 42a for accommodating O-ring 50a to insure a snug, airtight fit.

A float, follower or piston member 62 is provided for slidable movement within the cylindrical chamber 22 and is comprised of cylindrical spoollike member preferably made of plastic and coated with "Teflon." The head 64 and tail 66 of the piston have an annular rim 68 extending radially outward and contacting the cylindrical chamber 22. The side portions of the piston 62 have a recessed surface 70 to reduce frictional contact with the cylindrical chamber 22. Furthermore, a central passageway 72 interconnects the portions of the cylindrical chamber 22 located on either side of the piston 62. It should therefore be obvious that air forced into the lower end 26 will pass through piston 62 and leave through the upper end 27.

The base 26 of the cylindrical chamber 22 has a breathing tube assembly 73 comprised of a hollow tubular projection 74, and a tubular mouthpiece 76; said mouthpiece having an annular flange portion 78 in confronting relationship with an annular flange portion 80 of projection 74 for interlocking engagement in a snap fitting fashion. An O-ring 82 or other sealing means is additionally provided to insure airtightness and the mouthpiece 76 may also be provided with a finger grip 84.

The mouthpiece 76 can be fabricated from a relatively inexpensive or expendible material, such as treated paper or plastic, such that the mouthpiece will be readily disposable after use and can be economically replaced for hygienic purposes. The snap fit interlock will facilitate mouthpiece replacement and will additionally permit interchangeability when it is desired to use a modified mouthpiece incorporating an inhalator adapter. Such modification is shown in FIG. 8 wherein the suffix letter b has been used to designate like parts in this embodiment and the adapter is indicated generally by the reference numeral 86. The adapter 86 has a circular band 89 journaled around the mouthpiece 76b; the band 89 is additionally flared outwardly to form a holder 87 for receiving a medicament container (not shown). The portion of the mouthpiece 76b underlying the band 89 contains a port 90 so that when the adapter 86 is rotated to a position as indicated by the phantom lines in FIG. 9, the port 90 will be in registry with an intake duct 92 in the holder 87. Correspondingly, when the adapter 86 is rotated back to its initial position, the port 90 will be sealed by the band 89. This modification, similar to the mouthpiece 76 previously discussed, is adapted for snap fit engagement on the projection 74b and is shown with a finger grip 84b.

An alternate embodiment is shown in FIGS. 10–14 wherein the suffix letter c has been used to designate like elements in this particular embodiment.

This modification has a pedestal member 28c having a threaded portion 30c at one end and engaged in the cylindrical chamber 22c. A threaded plug member 32c is engaged in the other end of pedestal 28c in a manner similar to that previously described with respect to the embodiment shown in FIG. 2. The breathing tube assembly 73c is comprised of a hollow tubular projection 74c which extends outwardly from a pedestal member 28c, the assembly also includes a mouthpiece 76c and an adapter 86c affixed to or formed integrally with the mouthpiece 76c instead of rotatably mounting the adapter on the mouthpiece as previously described. In contrast, this version has the mouthpiece 76c journaled directly to the projection 74c. A shoulder portion 94 may be formed in the projection 74c to receive and positionally fix the mouthpiece 76c. Additionally, an O-ring 82c may be placed between the respective shoulder portion 94 and mouthpiece 76c to provide a snug and airtight seal.

A slidable gate valve arrangement is achieved between the projection 74c and mouthpiece 76c by means of a transverse wall 96 in the mouthpiece 76c, said wall being divided into quadrants with two opposed quadrants having sections removed to form openings 98. A corresponding and confronting transverse wall 100 is formed within the projection 74c, said wall also having openings 102 therein of the same general size and shape as the openings 98 in the mouthpiece 76c. These openings 102 will be in registry with openings 98 when the inhalator adapter 86c is in a nonoperative (or noninhalation) position as shown in FIG. 12. The mouthpiece 76c will now be in direct communication with the cylindrical chamber 22c. However, when the mouthpiece 76c and attached adapter 86c are rotated (counterclockwise in this embodiment), the openings 102 will no longer be in registration with the openings 98 and the transverse wall 96 will block the openings 102, (see FIG. 13). In this last mentioned position, an intake duct 92c in the adapter 86c will be aligned and in communication with a supplemental passageway 104 passing through transverse wall 100; said supplemental passageway 104 having a port 90c opening into the mouthpiece 76c as shown in FIGS. 13 and 14. It should thus be evident that when the adapter 86c is in the position shown in FIG. 13, the communication between the mouthpiece 76c and the chamber 22c will be sealed by means of the transverse wall 96 and the duct 92c will now deliver medicinal vapors from container 88 attached to a holder 87, for inhalation purposes through supplemental passageway 104, and into the mouthpiece 76c. Stop members or protuberances 106 and 108 may be affixed to the mouthpiece 76c and projection 74c respectively, to insure correct alignment between duct 92c and passageway 104.

The visual flow meter 20 in operation will react to the volume and flow rate of air inhaled into the cylindrical chamber 22 to move the piston 62 upwardly within the cylindrical chamber 22, the position reached can be determined from calibrated markings or other scale means 24 provided along the surface of the chamber 22. Additionally, the space occupied by the piston between the head 64 and tail 66 thereof may be etched or otherwise include a corresponding scale (not shown). Resistance to upward movement of the piston 62 and the distance that the piston will travel can be adjusted by means of the air exit regulator 34. The rotational setting of the regulator 34 to align one of the several apertures 38 having varying sizes, with the exit port 40 in the plug member 42 will determine the amount and rate of air escaping. This in turn will affect the resistance to the upward movement of the piston 62. Proper setting for the air exit regulator 34 can thus be calibrated for each individual patient.

The visual pulmonary meter 20 can be used to measure the patient's progress, as an indicator for determining when to take a prescribed medication, or as an inducement for pulmonary exercise. The meter may also be useful as a test after taking medication to determine the effectiveness of the medicine and will be particularly valuable in determining the effectiveness of such drugs as bronchial dilators, detergents, decongestants, mucolytic agents and antibiotics. It can also be used for exercising a patient's respiratory muscles. Furthermore, the breathing tube assembly, especially the modified versions, is suitable for use with other apparatus besides the pulmonary meter, and will thereby provide versatility to this disposable mouthpiece.

Thus it can be seen that this visual pulmonary meter achieves the various objects of the invention and is particularly adapted to meet the application of practical use.

The above cited embodiments are intended as exemplary and while they have described the invention with specific implementations thereof, other applications will be apparent to those skilled in the art. It should therefore be understood that all matter herein described or shown in the accompanying drawings is to be interpreted as illustrative and not in a limiting sense.

What is claimed is:

1. A visual pulmonary meter for respiratory function analysis comprising a transparent chamber, a piston slidably mounted within said chamber, a breathing tube assembly connected to an entry means into the chamber on one side of the piston for admitting air into the chamber to move the piston, passage means for conducting the air from one side of the piston to the other side, egress means for selectively regulating the escape of air from the chamber on the opposite side of the piston and adapter means associated with the breathing tube for introducing an inhalant.

2. A visual pulmonary meter for respiratory function analysis comprising a transparent cylindrical chamber, a piston slidably mounted within the chamber, entry means into the chamber on one side of the piston for admitting exhaled air to move the piston, means for permitting the exhaled air to pass from one side of the piston to an opposite side, and egress means from the chamber on the opposite side of the piston for selectively regulating the escape of air and the resultant resistance to piston movement.

3. A visual pulmonary meter as claimed in claim 1, wherein the egress regulating means includes a plug member placed in an upper end of the chamber, said plug member defining exit port, a cap member having at least one aperture, said cap member being rotatably mounted over the plug member, whereby the cap member may be selectively rotated to register said aperture with the exit port in the plug member.

4. A visual pulmonary meter as claimed in claim 2, wherein the plug member defines an annular groove around the periphery thereof, said groove being adapted to accommodate an O-ring to provide an airtight seal between the plug and the cylindrical chamber.

5. A visual pulmonary meter as claimed in claim 2, wherein the cap member defines an annular recess centrally located therein and the plug member has an annular protrusion adapted to be secured in said recess whereby the cap member may be rotated about said annular protrusion.

6. A visual pulmonary meter as claimed in claim 2, wherein the piston contains an annular rim at opposed ends thereof, said rim being in contact with the cylindrical chamber, and the piston further defining a central passageway for permitting exhaled air to pass from one side of the piston to the other side.

7. A visual pulmonary meter as claimed in claim 1, wherein the entry means includes a breathing tube assembly comprised of a hollow tubular projection extending from the cylindrical chamber, a tubular mouthpiece secured to the projection, and an adapter means attached to the mouthpiece for selectively admitting an inhalant.

8. A visual pulmonary meter as claimed in claim 7, wherein the mouthpiece is snap fit over a portion of the tubular projection and further includes an O-ring for providing airtightness to the connection.

9. A visual pulmonary meter as claimed in claim 7, wherein the adapter means includes a circular band rotatably journaled around the mouthpiece, a holder extending from the band for accommodating an inhalator container whereby the holder defines an intake duct therethrough for selective placement over a port in the side of the mouthpiece.

10. A visual pulmonary meter as claimed in claim 7, wherein the mouthpiece is rotatably journaled to the tubular projection and the adapter means includes a holder for accommodating an inhalator container, said holder being affixed to the mouthpiece and defines an intake duct therethrough leading to the interior of the mouthpiece, valve means formed between two respective transverse confronting walls within the mouthpiece and tubular projection for selectively sealing communication between the mouthpiece the cylindrical chamber to response to rotation of the mouthpiece and for correspondingly admitting an inhalant through the intake duct.

11. A visual pulmonary meter as claimed in claim 7, wherein stop members are affixed to the surface of the mouthpiece and tubular projection, said stop members being adapted for abutting engagement when the mouthpiece has been rotated and the adapter is in the inhalation position.

* * * * *